United States Patent [19]
Hagmann et al.

[11] Patent Number: 4,978,046
[45] Date of Patent: Dec. 18, 1990

[54] APPARATUS FOR ORIENTING ARTICLES IN RIVETING PRESSES AND THE LIKE

[75] Inventors: Paul Hagmann; Manfred Hardt, both of Stolberg, Fed. Rep. of Germany

[73] Assignee: William Prym-Werke GmbH, & Co. KG, Stolberg, Fed. Rep. of Germany

[21] Appl. No.: 374,944

[22] Filed: Jun. 30, 1989

[30] Foreign Application Priority Data

Jul. 4, 1988 [DE] Fed. Rep. of Germany ....... 3822519

[51] Int. Cl.$^5$ ............................................. A41H 37/10
[52] U.S. Cl. ......................................... 227/4; 227/119
[58] Field of Search ..................................... 227/4, 119

[56] References Cited

U.S. PATENT DOCUMENTS

| | | |
|---|---|---|
| 4,007,537 | 2/1977 | Silverbush et al. ............. 227/119 X |
| 4,019,666 | 4/1977 | Foults ................................. 227/119 |
| 4,493,448 | 1/1985 | Seki .................................... 227/119 |
| 4,541,558 | 9/1985 | Herten et al. ........................ 227/1 |
| 4,592,501 | 6/1986 | Sodeno et al. ..................... 227/119 |
| 4,596,349 | 6/1986 | Herten ................................ 227/18 |
| 4,659,001 | 4/1987 | Herten .............................. 227/153 |
| 4,694,984 | 9/1987 | Atwicker ............................. 227/18 |
| 4,703,882 | 11/1987 | Herten .................................. 227/8 |

FOREIGN PATENT DOCUMENTS 2909045 9/1980 Fed. Rep. of Germany .

Primary Examiner—Paul A. Bell
Attorney, Agent, or Firm—Peter K. Kontler

[57] ABSTRACT

A riveting press wherein the reciprocable ram of the upper tool can be rotated by a stepping motor to transmit torque to an article holding device which is reciprocable independently of the ram to pick up randomly oriented articles from a transferring device. The latter accepts successive randomly oriented articles from a chute and carries a sensor which interrupts rotation of the article and of the holding device when its follower detects a marker on the article. An adjustable selector switch or a computer is provided to induce the motor to turn the holding device and the article therein to a final angular position prior to application of the article to a garment.

28 Claims, 6 Drawing Sheets

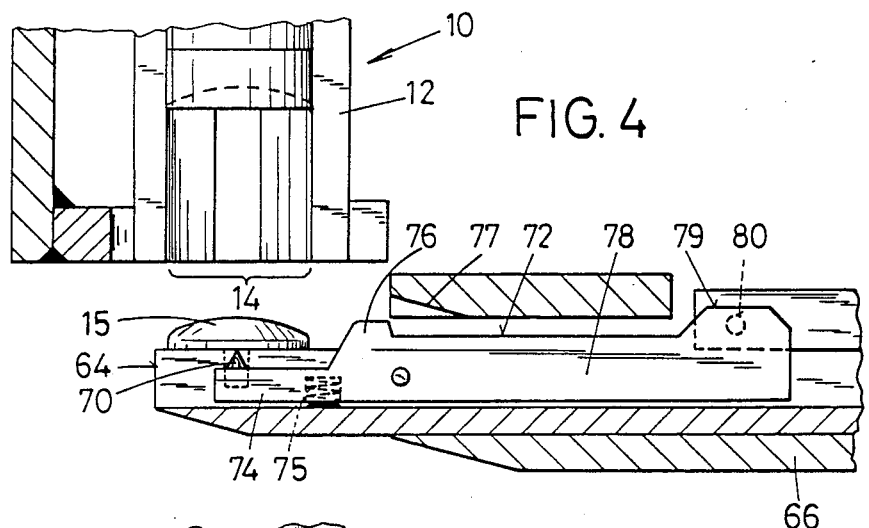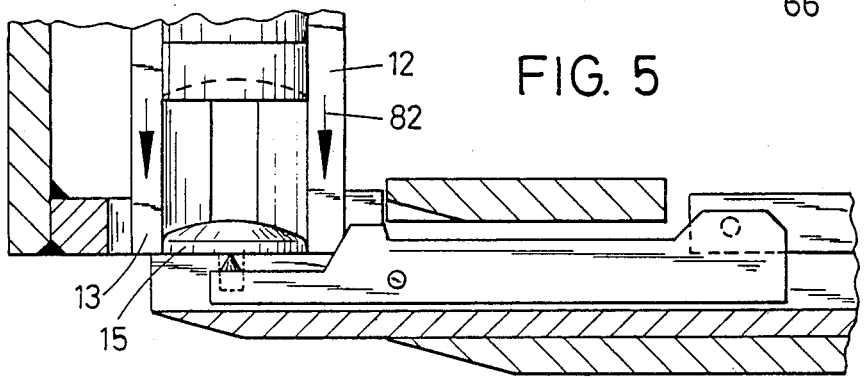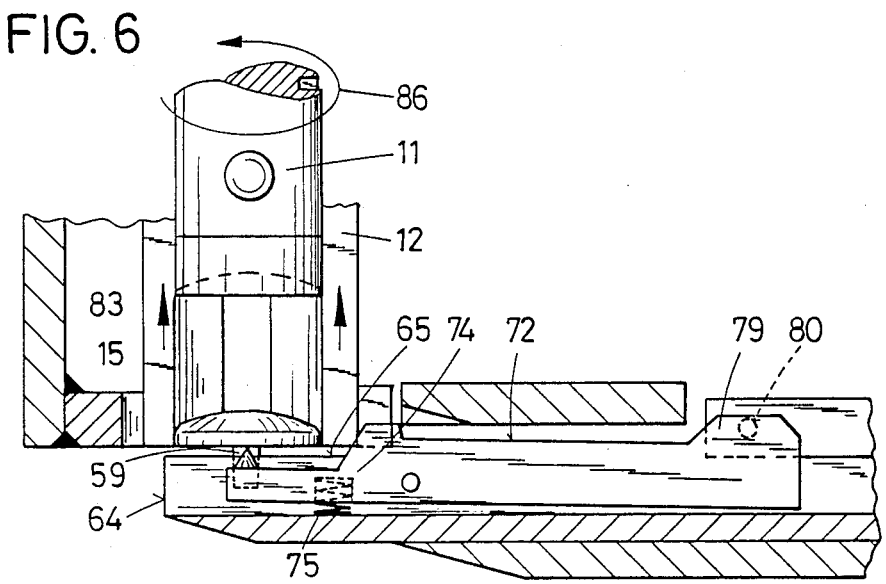

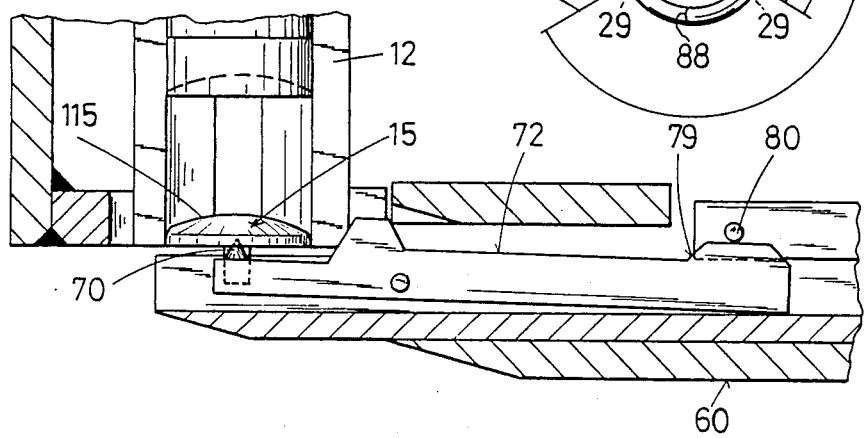
FIG. 7
FIG. 7a
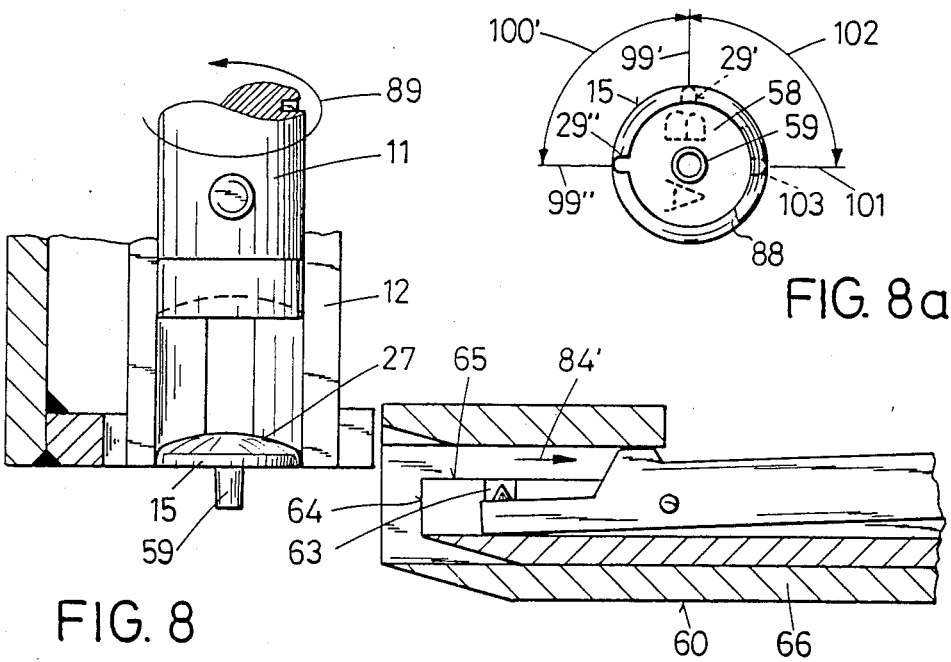
FIG. 8
FIG. 8a

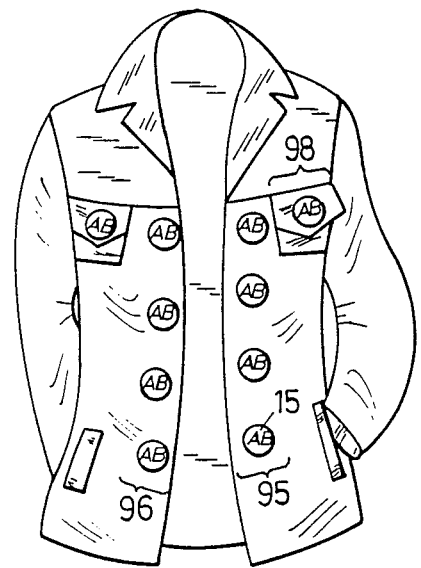
FIG. 10
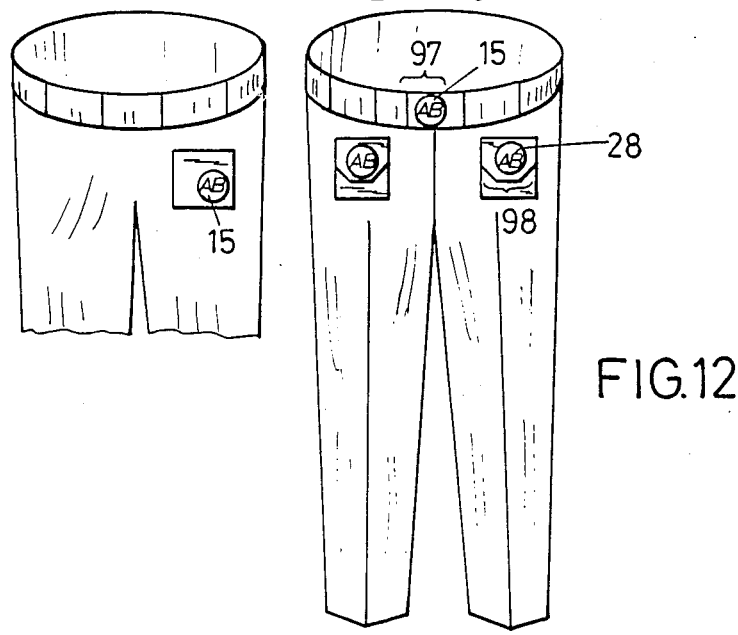
FIG. 11
FIG. 12
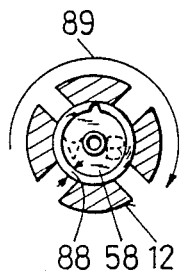
FIG. 13
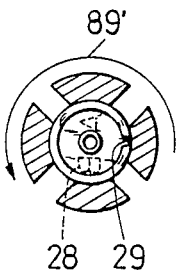
FIG. 14
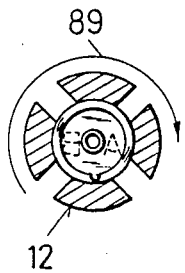
FIG. 15
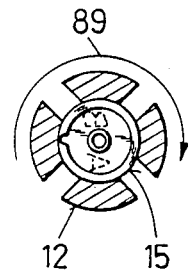
FIG. 16

APPARATUS FOR ORIENTING ARTICLES IN RIVETING PRESSES AND THE LIKE

BACKGROUND OF THE INVENTION

The invention relates to apparatus for manipulating portions of rivets, buttons, snap fasteners and like notions in riveting presses and analogous machines. More particularly, the invention relates to improvements in apparatus for changing the orientation of randomly oriented articles prior to attachment of properly oriented articles to complementary articles or to other commodities, for example, to garments.

The visible portions of rivets, snap fasteners, buttons and like notions are often provided with designs which serve to enhance the appearance of the articles and/or are intended to perform useful functions. It is necessary or advisable to attach such articles to complementary articles or to certain commodities in a predetermined orientation in order to enhance the appearance of the commodities and of the properly oriented articles and/or to enable the articles to perform a utilitarian function. For example, a properly oriented hook can be caused to enter and leave a complementary article in the form of an eyelet or the like. Furthermore, if the article to be oriented is provided with a design which includes one or more letters and/or numerals and such article is to be applied to a garment (e.g., to a jacket), the applied articles should normally be oriented in such a way that the letter(s) and/or numeral(s) of their designs should be in proper orientation for reading while the garment is worn by a person.

It is already known to facilitate proper orientation of relatively small articles which can be categorized as notions by providing the articles with indicia (hereinafter called markers) which are detected by a sensor while the respective article is rotated. Reference may be had to published German patent application No. 29 09 45 which discloses a machine wherein a motor serves to rotate a reciprocable ram which, in turn, rotates an article in a holding device for discrete articles by way of a spring which yields when the magnitude of torque exceeds a preselected value. The holding device has two prongs and is non-rotatably mounted in the machine. The marker of the rotating article which is held by the prongs of the holding device strikes a stop of the holding device and then assumes the predetermined angular position for attachment to a complementary article or to a garment. The apparatus which is disclosed in the published German application is not adjustable, i.e., the final angular position of the article in the holding device cannot be altered, and the apparatus is not provided with means for automatically feeding randomly oriented articles from a magazine to the holding device. Moreover, the space requirements of the holding device in the upper tool of the apparatus are such that there is no room for the provision of an adjusting device which would enable the operator to select the final angular position of an article prior to expulsion of the article from the prongs.

As mentioned above, if an article (e.g., a round part of a button, snap fastener or rivet) is provided with a design which is visible when the article is applied to a garment or to another commodity, it is desirable that the design be maintained in a predetermined orientation in order to enhance the utility and/or the appearance of the article. This holds true irrespective of whether the article is round, polygonal or has any other shape (such as that of a hook or eyelet). Heretofore known proposals to apply the articles in proper orientation (as far as the designs at their exposed surfaces are concerned) involved a time-consuming manipulation of the complementary articles and/or commodities to which the articles bearing a design are to be affixed. For example, if such articles are to be applied to garments, it is necessary to manipulate the garment until it assumes a position which ensures that the applied article is in proper orientation for observation of its design when the garment is worn. This not only takes up much time but also necessitates extensive training of operators of machines, such as riveting presses, which are used for the application of articles to garments. In addition, an operator must be on the alert at all times because each and every positioning of a garment on its support must be carried out with utmost care in order to ensure proper orientation of the design on each applied article. An alternative solution involved the application of first discrete articles to first selected portions of a series of successive garments, thereupon the application of second discrete articles to second selected portions of the same series of successive garments, and so forth. In other words, each and every garment which is to be provided with two or more articles must be repeatedly inserted into and removed from the machine. The reason is that the application of articles in the form of buttons which carry designs in the form of letters or the like is not uniform, i.e., the orientation of buttons on the sleeves is different from that on the flaps of pockets or on the front sides of jackets, blouses and similar garments. Therefore, many garments are simply provided with buttons which are without any visible designs or carry less desirable designs the orientation of which is immaterial.

OBJECTS OF THE INVENTION

An object of the invention is to provide a novel and improved apparatus which can properly orient portions of buttons, snap fasteners, rivets and similar notions in a simple and reliable manner.

Another object of the invention is to provide an apparatus which can be readily manipulated by skilled, semi-skilled or even unskilled persons with a minimum of training.

A further object of the invention is to provide an apparatus which occupies little room and can be incorporated in or combined with many existing types of machines (such as riveting presses) for the application of relatively small articles to garments and/or other commodities.

An additional object of the invention is to provide a versatile apparatus which can be readily adjusted to apply articles in any one of a practically infinite number of different orientations.

Still another object of the invention is to provide an apparatus which is constructed and assembled in such a way that the orientation of articles which are to be applied to garments or the like can conform to the position of a garment rather than the other way around.

A further object of the invention is to provide an apparatus which can alter the orientation of successively applied articles during the intervals between successive cycles of the machine (e.g., a riveting press) in which the apparatus is put to use.

An additional object of the invention is to provide the apparatus with novel and improved means for supplying randomly oriented articles to the orienting station.

Another object of the invention is to provide the apparatus with novel and improved means for selecting the orientation of articles which are to be applied to garments or the like.

A further object of the invention is to provide the apparatus with novel and improved means for holding and positioning randomly oriented articles in the course of the orientation changing operation.

An additional object of the invention is to provide a riveting press which embodies the above outlined apparatus.

Another object of the invention is to provide a novel and improved method of changing the orientation of randomly oriented parts of knobs, buttons, snap fasteners, rivets and/or other notions in a time-saving and predictable manner.

SUMMARY OF THE INVENTION

The invention is embodied in an apparatus for orienting discrete articles of the type including buttons, portions of snap fasteners, portions of rivets and other notions wherein the articles are provided with orientation indicating markers (e.g., in the form of unevennesses such as recesses or notches in the rims of buttons or the like). The improved apparatus comprises a rotary article holding device having means for non-rotatably engaging and holding one article at a time, stepping motor means which is operative to rotate the holding device, a source of randomly oriented articles, a device for transferring discrete articles from the source to the holding device, sensor means provided on at least one of the two devices to monitor the position of an article by scanning the article for the respective marker and including means for transmitting first signals enabling the motor means to rotate the holding device (while the article having the scanned marker is held by the engaging means) until the holding device and the article in its engaging means assume a first predetermined angular position, and selector means including means for transmitting to the motor means second signals to rotate the holding device and the article which is held by the engaging means from the first angular position to a predetermined second angular position. The arrangement is or can be such that the first rotary movement of the holding device is completed when the sensor means detects the marker of the article which is held by the engaging means, and the second angular movement of the holding device and of the article which is held by the engaging means can begin in automatic response to completion of the first angular movement and is terminated by the selector means as soon as the holding device reaches the second angular position.

The improved apparatus is preferably used to orient discrete articles and to attach oriented articles (i.e., articles which assume the second angular positions) to commodities, such as garments, articles of footwear and the like. Such apparatus further comprises a support (e.g., in the form of a substantially horizontal platform) for commodities adjacent the holding device, and means for affixing oriented articles (which are held by the engaging means in second angular positions) to commodities on the support. The affixing means can comprise a ram and means for reciprocating the ram relative to and substantially axially of the holding device between a retracted and an extended position so that the ram can expel an oriented article from the engaging means and affixes such article to the commodity on the support during movement to the extended position.

The motor means can include or can drive a torque transmitting device constituting a means for rotating the ram, and the ram then includes or is associated with means for rotating the holding device, i.e., the ram can be used as a means for transmitting torque between the output element of the motor means and the holding device.

The sensor means can be provided in or on the transferring device.

At least one of the two (transferring and holding) devices is movable relative to the other device to transfer an article from the transferring device to the engaging means. The mode of transfer can be such that the article which is in the process of being transferred is temporarily held by the engaging means and by the transferring device, and the sensor means can be designed to scan the articles for the purpose of detecting the markers, i.e., to detect the markers of articles which are temporarily held by the engaging means and by the transferring device.

Still further, the apparatus can comprise means for moving the holding device substantially axially relative to the transferring device to and from a predetermined axial position in which the engaging means non-rotatably engages and releasably holds a randomly oriented article in the transferring device. The transferring device can include means for maintaining a randomly oriented article in a predetermined position relative to the holding device. Such maintaining means can include a slot, a notch or another recess in which a portion of an article which is held by the engaging means can rotate while the holding device is rotated to move to the first or second angular position. The engaged portion of the article can constitute a shank of a button or of a portion of a rivet. The movement of the holding device toward the transferring device for the purpose of accepting or picking up a discrete article precedes a movement of the holding device and of the properly oriented article in the engaging means toward a commodity on the support preparatory to affixing of the oriented article to the commodity.

The engaging means of the holding device preferably includes a socket which receives an article from the transferring device in response to movement of the holding device to it is predetermined axial position. The means for moving the holding device to and from the transferring device preferably includes means for moving the holding device from the predetermined axial position through a short distance to a second axial position in which the marker of the article is adjacent and can be monitored by the sensor means while the holding device and the article which is held by the engaging means are free to rotate relative to the transferring device. The transferring device then preferably includes a bearing (such as the aforementioned notch, slot or recess) for a portion (such as the aforementioned shank) of the article which is held by the engaging means in the second axial position of the holding device.

The sensor means can include a spring-biased follower which is movably mounted on the at least one device. If the markers of the articles are unevennesses (e.g., recesses or notches in the rims of substantially round articles), the follower is operative to track the article which is rotated by the engaging means to effect the generation of a signal in response to detection of the unevenness on the tracked article Such sensor means can further comprise an optoelectronic detector which is operative to generate a signal to arrest the motor means in response to detection of an unevenness by the follower (because the article which is held by the engaging means then assumes the first angular position). The transferring device can comprise a lever having a first arm which supports the follower and a second arm which is movable between a radiation source and a signal generating transducer of the optoelectronic detector. The lever is biased by a spring which urges the follower against an article which is held by the engaging means, and the mounting of the lever is such that its second arm moves to or from a position in which the second arm permits radiation issuing from the radiation source to reach the transducer in response to engagement of the follower with a marker on the article which is held by the engaging means. The transducer is operatively (directly or indirectly) connected with the motor means to ensure that the motor means is arrested when the follower engages an unevenness or that the motor means is ready to continue to rotate the holding device to the extent which is necessary to move the engaging means and the article therein from the first to the second angular position. The follower can include a substantially pin-shaped portion which can enter (particularly in part) a recess, cutout or slot constituting or forming part of the marker on the article which is rotated by the engaging means for the purpose of assuming the first angular position.

The ram of the aforementioned affixing means can be provided with an extension which is non-rotatably but axially movably coupled to the output element of the stepping motor means. The extension extends in a direction away from the holding device. The extension or another portion of the ram is or can be rotatably coupled to the means for reciprocating the ram. The means for rotating the holding device in response to rotation of the ram preferably includes means for axially movably connecting the ram and the holding device to each other so that the holding device can perform its axial movements with or relative to the ram and/or vice versa.

The engaging means of the holding device can comprise a plurality of resilient sections (e.g., in the form of claws or prongs) which define the aforementioned socket for discrete articles.

The selector means can include means for selecting the extent and the direction of rotation of the holding device with an article in the engaging means as a function of the difference between the first and second angular positions. Such selector means can comprise a switch including a portion which is movable by hand between a plurality of different positions each corresponding to a different second angular position of an article which is held by the engaging means of the holding device. Alternatively, the selector means can include a computer having a first input for data denoting the second angular positions of articles which are held by the engaging means, and a second input for data denoting the number of successive articles which are to assume identical second angular positions.

The means for affixing oriented articles to garments or other commodities can be started as soon as the orienting operation is completed, i.e., as soon as an article which is held by the engaging means assumes the selected second angular position.

The operation of the selecting means can be chosen in such a way that the second angular position can be selected practically at any stage of operation of the apparatus, for example, even while an article which is held by the engaging means is in the process of rotating toward its first angular position.

The transferring device is preferably movable between the source of randomly oriented articles and the holding device. The arrangement may be such that the transferring device remains adjacent the holding device between successive cycles of the apparatus.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWING

FIG. 4 is an enlarged view of a detail in FIG. 3 but showing the slide of the article transferring device in the extended position in which a randomly oriented article on the slide is in register with the socket of the article holding device;

FIG. 5 shows the structure of FIG. 4 but with the article holding device in a lowered position in which the randomly oriented article is received in the engaging means of the holding device;

FIG. 6 shows the structure of FIG. 5 but with the article holding device in a slightly raised position to lift the randomly oriented article off the upper side of the slide of the article transferring device;

FIG. 7 shows the structure of FIG. 6 with a pivotable lever of the article transferring device in an angular position in which the sensor on the transferring device effects a stoppage of the stepping motor;

FIG. 7a is a bottom plan view of the partially oriented article in the angular position of FIG. 7;

FIG. 8 shows the structure of FIG. 7 but with the article in the final angular position and the article transferring device in retracted position for reception of a fresh randomly oriented article;

FIG. 8a is a bottom plan view of the article which is shown in FIG. 8;

FIG. 10 illustrates portions of two types of a garment which can be provided with oriented articles;

FIG. 11 shows a portion of a different garment;

FIG. 12 shows a further garment;

FIG. 13 is a fragmentary bottom plan view of the article holding device with an article which is to be oriented preparatory to the application to a garment of the type shown in FIG. 12;

FIG. 14 is a similar fragmentary bottom plan view of the holding device with an article which is to be oriented preparatory to the application to a garment shown in the right-hand portion of FIG. 10;

FIG. 15 is a similar fragmentary bottom plan view of the holding device with an article which is to be oriented prior to its application to garments of the type shown in FIGS. 10 and 11; and FIG. 16 is a similar fragmentary bottom plan view of the holding device with an article which is to be oriented prior to its application to garments of the type shown in the left-hand portion of FIG. 10.

DESCRIPTION OF PREFERRED EMBODIMENTS

Figure 1:
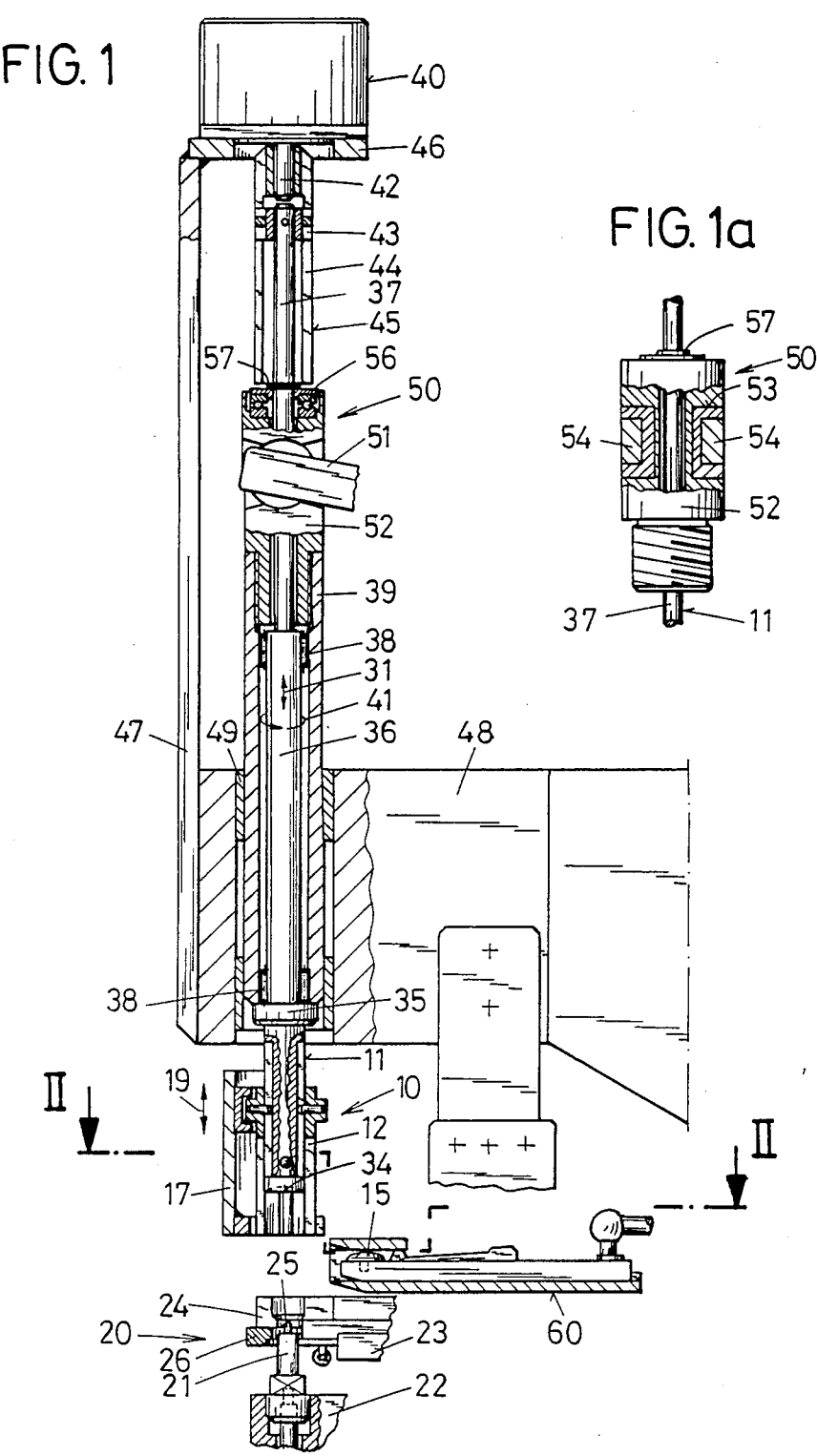
FIG. 1 is a fragmentary partly elevational and partly sectional view of a riveting press which includes an article orienting apparatus embodying one form of the invention, the ram and the article holding device of the apparatus being shown in their retracted positions.
Figure 2:
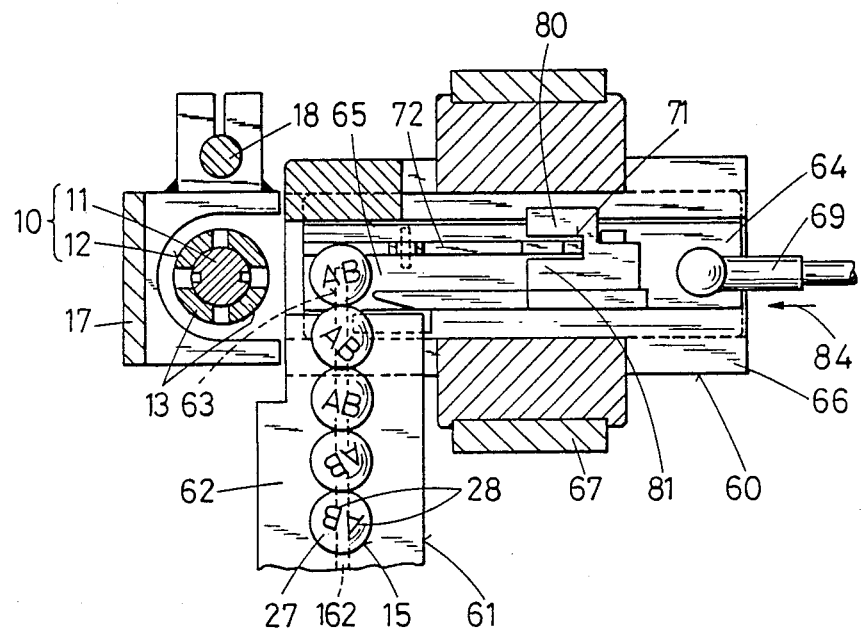
FIG. 2 is an enlarged fragmentary horizontal sectional view as seen in the direction of arrows from the line II—II of FIG. 1.
Figure 3:
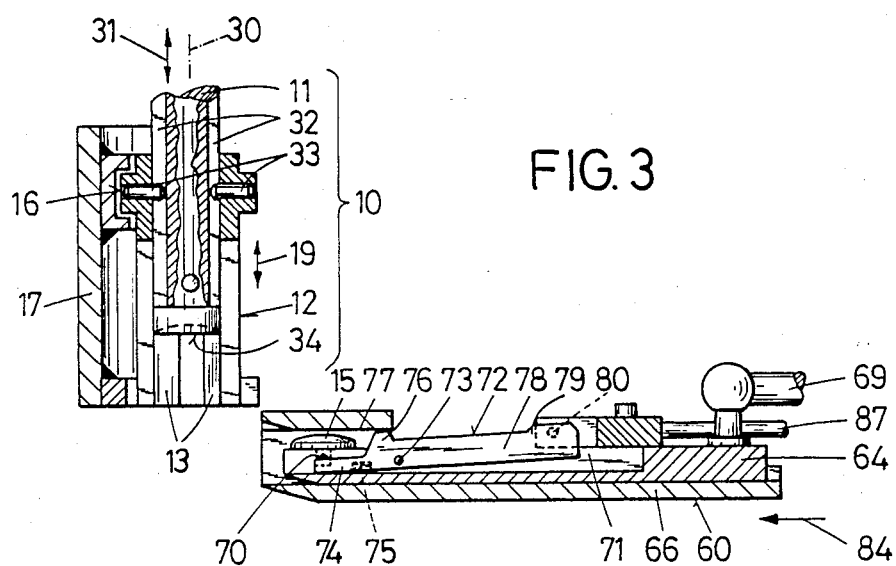
FIG. 3 is an enlarged view of a detail in the lower part of FIG. 1 but with the section through the article transferring device taken in a different plane.

FIG. 1 shows a portion of an apparatus which constitutes or can be used as a riveting press. The apparatus comprises an upper or active tool 10 and a lower or passive tool 20 at a level beneath and substantially in line with the upper tool. Each of these tools is movable up and down with and/or relative to the other. The upper tool 10 comprises means for affixing properly oriented discrete articles 15 to complementary commodities, such as garments of the type shown in FIGS. 10 to 12, and the affixing means comprises a vertically reciprocable member 11 (hereinafter called ram for short) and means 50 for reciprocating the ram 11 relative to a supporting platform 26 of the lower tool 20. The upper tool 10 further comprises an article holding device 12 which is mounted for vertical reciprocatory movement with and/or without the ram 11 and comprises article engaging means 13 including four resilient prongs or claws (FIG. 2) which define a socket 14 (FIG. 4) for discrete articles 15. The holding device 12 can constitute or include a cylindrical sleeve which is slotted in the region of its lower end to form the four prongs of the engaging means 13. As can be seen in FIG. 3, the upper portion of the sleeve-like holding device 12 has an external collar 16 received in part in a complementary groove of a supporting member 17. The latter forms part of means for moving the holding device 12 up and down independently of the ram 11, and such moving means further comprises a motion transmitting rod 18 which is shown in FIG. 2 and receives motion from a prime mover M1 (FIG. 9) at times and for the purposes as will be fully described hereinafter. The double-headed arrow 19 indicates in FIG. 3 the directions of movement of the holding device 12 independently of the ram 11 in response to reception of motion from the moving means 17, 18.

The rod 18 is parallel to the axis 30 (FIG. 3) of the ram 11, and the double-headed arrow 31 of FIG. 3 denotes the directions of movement of the ram 11 relative to the platform 26 of the lower tool 20.

The ram 11 forms part of the means for transmitting rotary motion from a stepping motor 40 to the holding device 12. The means for rotating the holding device 12 in response to rotation of the ram 11 includes one or more elongated axially parallel grooves 32 in the peripheral surface of the ram 11 (FIG. 3) and radially disposed pins 33 which are anchored in the upper portion of the holding device 12 and have tips extending into the adjacent grooves 32. Such rotating means for the holding device 12 ensures that the device 12 is compelled to share the angular movements of the ram 11 but that the ram and the device 12 can move axially (arrows 31 and 19) independently of each other. The means for reciprocating the holding device 12 in the directions which are indicted by arrow 19 includes the aforementioned supporting member 17 and rod 18 and can further comprise a suitable motion transmitting connection between the means (50) for reciprocating the ram 11 and the rod 18 and/or supporting member 17.

The lower end portion of the ram 11 has a recess 34 bounded by a concave surface which is complementary to the exposed upper surface of an article 15 in the socket 14 of the engaging means 13. This ensures that the lower end portion of the ram 11 lies flush or practically flush against the exposed surface of a properly oriented article 15 which is about to be affixed to a garment on the platform 26. If the article 15 is part of a rivet, its shank 59 (see FIG. 6) is caused to engage a complementary portion of the other part of the rivet which is then supported by the lower tool 20. Reference may be had, for example, to commonly owned U.S. Pat. No. 4,659,001 granted Apr. 21, 1987 to Herten which shows a riveting press for the application of rivets to garments or the like, or to commonly owned U.S. Pat. No. 4,596,349 granted June 24, 1986 to Herten which discloses a riveting press for attachment of male and female components of snap fasteners to each other and to articles of clothing or the like.

The ram 11 comprises a larger-diameter portion or collar 35 which is located at a level above the holding device 12 and directly below an elongated shaft 36 movable up and down in and rotatable relative to an elongated upright cylinder 39. Roller bearings 38 and/or other types of antifriction bearing means are interposed between the shaft 36 and the cylinder 39. The shaft 36 is disposed at a level below a smaller-diameter portion or extension 37 of the ram 11, and this extension is axially movably connected with the output element 42 of the stepping motor 40 by a torque transmitting device including an elongated sleeve 45 which is non-rotatably secured to the output element 42, and a slide or carriage 43 which is non-rotatably affixed to the upper end portion of the extension 37 and has radially outwardly extending protuberances received in axially parallel slots 44 of the sleeve 43. Thus, the extension 37 and its carriage 43 can move up and down with reference to the output element 42 but they are compelled to share all angular movements of the output element. One of the directions in which the stepping motor 40 can rotate the ram 11 (and hence the holding device 12 and its engaging means 13) is indicated by arrow 41. The cylinder 39 and the bearings 38 therein cooperate with the shaft 36 to ensure that the ram 11 must move up and down along a predetermined path.

The stepping motor 40 is mounted on a plate-like support 46 which, in turn, is mounted on an upright carrier 47 (e.g., in the form of a rod or bar). The carrier 47 is secured to a stationary frame member 48 of the apparatus.

The cylinder 39 and the bearings 38 therein share the axial movements of the ram 11 in directions which are indicated by the arrow 31. To this end, the frame member 48 is provided with an elongated bearing sleeve 49 which reciprocably receives the cylinder 39. The lower end portion of the cylinder 39 abuts or is adjacent the collar 35 between the lowermost portion and the shaft 36 of the ram 11.

Figure 1A:
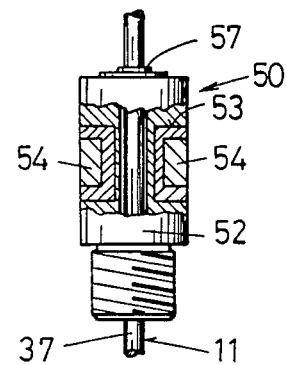
FIG. 1a shows the details of the connection between the ram and the means for reciprocating the ram relative to the article holding device.

Certain details of the means 50 for reciprocating the ram 11 relative to the bearing sleeve 49 are shown in the upper part of FIG. 1 and in FIG. 1a. Such reciprocating means comprises an arm 51 which is the output member of a linkage of known design and is turnably (pivotably) connected with the extension 37 of the ram 11 in such a way that the ram is free to rotate about its axis 30 with reference to the arm 51. The upper end portion of the cylinder 39 mates with a sleeve 52 having two external sockets 53 which are disposed diametrically opposite each other and receive pins or stubs 54 forming part of the arm 51. The latter is preferably bifurcated and each of its two prongs carries one of the stubs 54. A different construction of means for moving a reciprocable member of a riveting press up and down is disclosed in commonly owned U.S. Pat. No. 4,703,882 granted Nov. 3, 1987 to Herten. The disclosure of this patent is incorporated herein by reference because the patented press embodies several features which can be utilized in the apparatus of the present invention, for example, the means for coupling one or more parts of the lower tool to the means for moving one or more parts of the upper tool.

FIG. 1 shows the ram 11 and the holding device 12 in their uppermost or retracted positions. In the circuit diagram of FIG. 9, the box A denotes the reciprocating means 50 for the ram 11. When the ram 11 reaches the upper end position of FIG. 1, the reciprocating means (A or 50) actuates a switch S6 (FIG. 9) which transmits a signal to a control unit C2 for the prime mover M1 (e.g., a polyphase current motor) which drives the reciprocating means 50 (when necessary) and the output element of which can be held against rotation by a brake P. Thus, the motor M1 for the reciprocating means 50 is arrested in a fully automatic way as soon as the ram 11 reaches or is very close to its upper end position of FIG. 1, and the brake P is applied to maintain the ram in the upper end position.

When the article 15 which is held by the engaging means 13 of the holding device 12 is properly oriented for attachment to a garment on the platform 26, the person in charge depresses a foot pedal (not shown) to actuate a switch S5 which transmits a signal to the control unit C2 for the prime mover M1. This starts a cycle which involves proper orientation of an article in the engaging means 13 and the affixing of the oriented article 15 to the garment on the platform 26. The prime mover M1 is started and moves the reciprocating means 50 (A) by way of a suitable operative connection 55 which is indicated by a broken-like arrow. The reciprocating means 50 then moves the ram 11 downwardly with reference to the slotted sleeve 45 on the output element 42 of the stepping motor 40 as well as with reference to the holding device 12. Thus, the carriage 43 at the upper end of the extension 37 slides in the sleeve 45 (the stepping motor 40 is then idle), and the grooves 32 move relative to the respective stubs 33 in the holding device 12. The arm 51 of the reciprocating means 50 moves the ram 11 downwardly through the medium of the sleeve 52 which is threadedly connected with the cylinder 39. The latter acts upon the collar 35 of the ram 11 so that the ram moves downwardly within the holding device 12, and the concave surface in the recess 34 of its lower end face engages the exposed convex surface of and pushes the properly oriented article 15 from the socket 14 of the engaging means 13 toward the garment on the platform 26.

The upper end of the sleeve 52 carries a thrust bearing 56 (FIG. 1) which is held in position by a split ring 57 extending into a circumferential groove (not shown) of the extension 37 of the ram 11. The thrust bearing 56 cooperates with the cylinder 39 and split ring 57 to hold the sleeve 52 of the reciprocating means 50 against axial movement relative to the ram 11 and vice versa.

In addition to the platform 26, the lower tool 20 comprises a frame member 22 for a fixedly mounted anvil 21 which carries a mandrel 25. The platform 26 is also mounted on the frame member 22 and supports retaining or engaging means 24 for the complementary article (such as a second portion of a rivet if the article 15 in the engaging means 13 of the holding device 12 constitutes a first portion of a rivet). The retaining means 24 is mounted at one end of a pivotable lever 23 and is designed to maintain the complementary article in an optimum position for engagement with the article 15 which is expelled from the engaging means 13. The complementary article is held beneath the garment which overlies the platform 26 so that a portion (such as a shank 59 shown in FIG. 6) of the article 15 penetrates through the garment on the platform 26 and reliably engages a female portion of the complementary article in the retaining means 24. As shown in the aforementioned U.S. Pat. No. 4,703,882 to Herten, the lever 23 can receive motion from the means for reciprocating the ram 11. To this end, the entire platform 26 can be moved up and down, together with the complementary article in the retaining means 24, so that the complementary article comes to rest on the fixedly mounted anvil 21 not later when the shank 59 of the properly oriented article 15 has penetrated the garment on the platform 26 and is about to be permanently or substantially permanently affixed to the complementary article and hence to the garment.

As can be seen in FIGS. 2, 7, 7a, 8, 8a and 13 to 16, an article 15 which is to be properly oriented by the holding device 12 prior to affixing it to a garment on the platform 26 can comprise a cupped head 115 which has a radially inwardly bent rim 88 to retain a disc-shaped portion 58 which is provided with the aforementioned shank 59. The exposed (convex) surface 27 of the head 115 is provided with a design 28 (here shown as being composed of the letters "A" and "B") which is to be properly oriented when the article 15 is applied to a garment or the like. The design 28 can include one letter or more than two letters, letters and numerals or other decorative and/or advertising material (e.g., the trademark of the manufacturer of garments). Such design can be painted, sprayed, embossed and/or otherwise applied to the convex surface 27 of the head 115.

In order to facilitate proper orientation of the article 15 upon insertion into the socket 14 of the engaging means 13, the article is provided with a marker 29 in the form of an unevenness in the rim 88 of the head 115. The illustrated marker 29 is a recess or cutout or notch which is provided in the rim 88 in a predetermined position with reference to the design 28 so that, when the marker 29 is detected by the pin-shaped follower 70 of a sensor on an article transferring device 60 of the improved apparatus, the article 15 and its design 28 are maintained in a predetermined angular position with reference to the supporting member 17 for the holding device 12. In other words, the holding device 12 then assumes a predetermined (first) angular position because rotation of the article 15 (in order to move its marker 29 toward engagement with the follower 70 of the aforementioned sensor) takes place when the article 15 is already held by the engaging means 13 to thus ensure that it must share the angular movements of the holding device 12. In the illustrated articles 15, the markers 29 are located midway between and at a level beneath the respective designs 28, i.e., midway between and below the respective letters "A" and "B".

It goes without saying that the markers 29 can constitute prongs on the heads 115 and/or discs 58 and/or shanks 59 of the articles 15 as well as that the markers can form part of the respective designs, i.e., they can be provided on the convex surfaces 27. The illustrated markers 29 in the form of notches, recesses or cutouts have been found to be suitable and easy to make when the articles 15 are parts of buttons, knobs, snap fasteners, rivets or like notions. The illustrated markers or unevennesses 29 can be formed by providing the rims 88 with relatively shallow channels as a result of application of the working end of a piercing or cutting tool, or in any other suitable way as long as they are properly positioned with reference to the corresponding designs 28.

The articles 15 can be connected with complementary articles in the form of hooks, eyelets or buttons, or they may constitute or resemble hooks, eyelets, buttons or like notions. The shanks 59 can be replaced with female detent elements which serve to receive portions of male detent elements forming part of complementary articles which are supplied to the retaining means 24 of the lower tool 20. As a rule, the engaging means 13 will serve to temporarily hold and turn those articles which are applied to the outer sides of garments or the like so that proper orientation of the designs on their exposed surfaces is desirable and important because it enhances the appearance and sales appeal of the garments. The same holds true if the articles 15 are applied to other commodities wherein or whereon they are visible and improper orientation of their designs would reduce the sales appeal or even the utility of the commodities (for example, if the articles to be oriented are or include hooks or eyelets which must be properly positioned or oriented in order to facilitate engagement with eyelets or hooks on the same commodities or on separate commodities).

In addition to the holding device 12, its engaging means 13, the means 17, 18 for moving the holding device 12 up and down (arrow 19) and the means (including the ram 11 and the motor 40) for rotating the holding device 12, the means for properly orienting discrete articles 15 (one at a time) comprises the article transferring device 60 which is movable between the holding device 12 and a source 61 of supply of randomly oriented articles 15. As can be seen in FIG. 2, the source 61 comprises an elongated guide rail 62 which has a longitudinally extending channel 162 serving as a means for positioning the randomly oriented articles 15. The channel 162 receives the shanks 59 and the source 61 can constitute or form part of a chute which delivers a single file of randomly oriented articles 15 into the range of the transferring device 60 by gravity feed. Predictable positioning of articles 15 having their shanks 59 in the channel 162 is further ensured in that the rims 88 of the heads 115 rest on the upper side of the rail 62. The guide rail 62 serves as a means for delivering randomly oriented articles 15 from a magazine, not shown, such as that disclosed in commonly owned U.S. Pat. No. 4,694,984 granted Sept. 22, 1987 to Altwicker or in commonly owned U.S. Pat. No. 4,541,558 granted Sept. 17, 1985 to Herten et al.

The weight of the file of next-following articles on the rail 62 urges the foremost article 15 toward and into the range of the transferring device 60 which has a slide 64 serving to shuttle between the discharge end of the rail 62 and a position of alignment of the article 15 thereon with the socket 14 of engaging means 13 on the holding device 12.

The slide 64 of the transferring device 60 as a lateral slot 63 (see particularly FIGS. 2 and 8) which receives the shank 59 of the foremost article 15 of the file on the rail 62 and constitutes a bearing wherein the foremost article can rotate with the prongs of the engaging means 13 when the holding device 12 is set in rotary motion with the article 15 in the socket 14. The slide 64 has an upper side 65 serving as a rest for the rim 88 of the article 15 having its shank 59 in the slot or bearing 63. Thus, once an article 15 comes to rest on the upper side 65 of the slide 64 and its shank 59 extends into the slot 63 of the slide, such article is ready to be received in the socket 14 of the engaging means 13 and is properly positioned with reference to the ram 11 except that, as a rule, the orientation of its design 28 must be changed to an optimum orientation prior to attachment of the thus oriented article to a garment on the platform 26 of the lower tool 20.

The slide 64 is reciprocably mounted in a guide 66 of the transferring device 60 and can be reciprocated by a mechanism including a pusher 69 (shown in FIGS. 1 to 3). The pusher 69 is the output member of a mechanism L (e.g., a linkage) which is shown schematically in FIG. 9 and can receive motion from the prime mover M1 by way of a suitable motion transmitting connection indicated by a broken-line arrow 68. A holder 67 (FIG. 2) serves to secure the guide 66 for the slide 64 of the transferring device 60 to the frame member 48 or to any other stationary part of the frame.

FIGS. 2 and 3 show the slide 64 in a retracted position in which the slot or bearing 63 is in register with the open front end of the channel 162 in the rail 62 of the source 61. The aforementioned pin-shaped follower 70 of the sensor on the transferring device 60 is installed on the relatively short first or front arm 74 of a lever 72 which is pivotally mounted in the slide 64, as at 73, and has a longer second or rear arm 78 carrying a plate-like portion or shutter 79 which can interrupt the propagation of radiation from a radiation source 80 to a signal generating transducer 81 of an optoelectronic transducer forming part of the sensor including the follower 70. The slide 64 has a longitudinally extending slot 71 for a portion of the lever 72. The follower 70 of the sensor on the transferring device 60 is in line with the rim 88 of the head 115 forming part of the article 15 having its shank 59 in the slot 63 of the slide 64. Thus, if the follower 70 is free to actually bear against the rim 88 under the action of a biasing means 75 here shown as a relatively weak coil spring, it detects the marker (unevenness) 29 of the rim 88 in response to a certain angular displacement of the article 15 relative to the slide 64, namely with the engaging means 13 of the holding device 12.

The spring 75 is not automatically free to bias the follower 70 against the rim 88 of the article 15 which has a shank 59 in the slot 63. The reason is that the front or first arm 74 of the lever 72 further carries a protuberance in the form of a lobe 76 tracking a cam face 77 of the guide 66 when the slide 64 is in the retracted position of FIGS. 2 and 3. The arrangement is such that the spring 75 is compressed and the follower 70 is spaced apart from the rim 88 of the article 15 resting on the upper side 65 of the slide 64 when the lobe 76 engages the cam face 77. This ensures that the follower 70 of the sensor on the transferring device 60 does not interfere with predictable transfer of the foremost randomly oriented article 15 from the rail 62 onto the slide 64, i.e., the sensor does not interfere with predictable entry of the shank 59 of the foremost article 15 into the slot 63. At such time, i.e., when the lobe 76 engages the cam face 77, the shutter 79 on the rear arm 78 of the lever 72 is disposed in the path of radiation which issues from the radiation source 80 and prevents such radiation from reaching the transducer 81. The radiation source 80 and the transducer 81 of the photoelectronic detector which forms part of the sensor on the transferring device 60 are disposed at opposite sides of the groove or channel 71 for the lever 72. The connection between the transducer 81 and a control unit C1 for the stepping motor 40 (M2) of FIGS. 1 and 9 comprises conductor means 87.

When the aforementioned pedal is depressed to actuate the switch S5 and to thus start a cycle, the operative connection (arrow 68) between the prime mover M1 and the linkage L causes the motion transmitting connection including the pusher 69 to move the slide 64 of the transferring device 6 from the retracted position of FIGS. 1 and 3 toward the extended position of FIGS. 4 to 7 (note the arrow 84 in FIG. 3). The advancing slide 64 entrains the article 15 which rests on its upper side 65 and the shank 59 of which extends into the slot 63. The forward movement of the slide 64 in the direction of arrow 84 is terminated by the pusher 69 when the head 115 of the article 15 resting its rim 88 on the upper side 65 of the slide 64 is in exact register with the socket 14 of the engaging means 13. At such time, the lobe 76 on the front arm 74 of the lever 72 has advanced beyond the cam face 77 of the guide 66 so that the spring 75 tends to dissipate energy and to lift the article 15 off the upper side 65 of the slide 64. However, the bias of the spring 75 is preferably so weak that the follower 70 is free to actually contact the rim 88 which rests on the upper side 65 of the slide 64 but the spring 75 is incapable of lifting the rim 88 off the upper side 65. Therefore, the angular position of the lever 72 remains such that the shutter 79 is still located in the path of radiation from the radiation source 80 toward the transducer 81 and the latter cannot transmit a signal via conductor means 87 to arrest the stepping motor 40 (M2) by way of the control unit C1. This can be seen in FIGS. 4 and 5 wherein the shutter 79 still overlies the radiation source 80 even though the lobe 76 is located to the left of the cam face 77.

The next stage of the cycle involves a downward movement of the holding device 12 in the direction of arrow 82 (FIG. 5) whereby the lower end portions of the prongs of engaging means 13 yield and frictionally engage the peripheral surface of the head 115 of the article 15 on the upper side 65 of the slide 64. Thus, at such time, the article 15 is held by the slide 64 of the transferring device 60 (because the shank 59 of the article still extends into the slot 63 of the slide 64) and the article is also held by the engaging means 13 of the holding device 12 (because the peripheral surface of the head 115 is engaged by the resilient prongs of the engaging means 13) so that the article is compelled to share the rotary movements of the holding device 12 while the surface bounding the slot 63 acts as bearing and centers the shank 59 of the rotating article. When it reaches the lowermost or first axial position of FIG. 5, the holding device 12 can actually abut the upper side 65 of the slide 64. The downward movement of the holding device 12 is effected by the supporting member 17.

The just described stage of a cycle, namely the stage during which the holding device 12 moves in the direction of arrows 82 (from the axial position of FIG. 4 to the axial position of FIG. 5), can be said to constitute one half of a pickup movement of the holding device which results in actual transfer of the article 15 from the slide 64 into the socket 14 of the engaging means 13. The next stage (shown in FIG. 6) involves a relatively short upward movement of the holding device 12 (arrows 83) whereby the rim 88 of the article 15 is slightly lifted off the upper side 65 of the slide 64 but a portion of the shank 59 of such article continues to extend into the slot 63. The extent of upward movement of the holding device 12 (arrows 83) is or can be very small (e.g., not more than one-tenth of one millimeter) and is exaggerated in FIG. 6 for the sake of clarity. All that counts is to terminate (or at least appreciably reduce) frictional engagement between the rim 88 of such article and the upper side 65 of the slide 64. The slide 64 of the transferring device 60 continues to dwell in the extended position in which its upper side 65 is disposed beneath the socket 14 in such position that the shank 59 of the article 15 having its head 115 engaged by the prongs of the engaging means 13 continues to extend into the slot 63 of the head 64.

The spring 75 is free to dissipate energy as the holding device 12 rises from the lower axial position of FIG. 5 to the upper axial position of FIG. 6 so that the lever 72 is pivoted in a clockwise direction (compare FIGS. 6 and 7) and the follower 70 continues to contact the underside of the rim 88. The shutter 79 tends to but cannot as yet descend beneath the path of radiation which is emitted by the source 80 of the photoelectronic detector so that the transducer 81 would transmit a signal via conductor means 87 to initiate actuation of a switch S3 and stoppage of the motor 40. Thus, FIG. 6 shows the lever 72 in an angular position in which the rim 88 is already lifted off the upper side 65 of the slide 64 but the shutter 79 is still operative to block the propagation of radiation toward the transducer 81. Lifting of the holding device 12 off the upper side 65 of the slide 64 entails the closing of a switch S4 (FIG. 9) which transmits a signal to the control unit C1 so that the latter starts the stepping motor 40 via conductor means 85. The motor 40 rotates the ram 11 by way of the torque transmitting connection 43-45, and the ram 11 causes the rotating means 32, 33 to rotate the holding device 12, its engaging means 13 and the article 15 in the socket 14. This is indicated by arrow 86 which is shown in FIG. 6.

As the article 15 turns with the holding device 12, the marker 29 in the rim 88 of such article approaches and ultimately reaches the follower 70. The latter is free to penetrate into the marker 29 (it being assumed here that the marker 29 is a slot, recess, cutout or notch in the rim 88) so that the spring 75 is free to dissipate additional energy and to pivot the lever 72 in a clockwise direction from the angular position of FIG. 6 to the angular position of FIG. 7. This results in a movement of the shutter 79 away from the path of propagation of radiation from the radiation source 80 so that the transducer 81 transmits a signal (via conductor 87) to the switch S3 which, in turn, transmits a stop signal to the control unit C1 for the stepping motor 40. At such time, the marker 29 has assumed the first angular position 29' which can be best seen in FIG. 7a. The signal from the transducer 81 causes the control unit C1 to arrest the stepping motor 40. This ensures that the article 15 which is held by the prongs of the engaging means 13 invariably assumes a first angular position (corresponding to the position 29' of the marker 29) before the motor 40 is started again to rotate the holding device 12 until the latter (and the article 15 in the socket 14) reaches a predetermined second angular position (corresponding to the angular position 29" of the marker 29 which is shown in FIG. 8a), namely a position at a preselected distance from the first angular position (corresponding to the angular position 29' of the marker 29). In other words, prior to reaching its ultimate angular position preparatory to being affixed to the garment on the platform 26, each article 15 assumes a first angular position corresponding to a predetermined orientation of the design 28 on its head 115 (for example, at 90° from the ultimate angular position).

At such time, the transferring device 60 and its sensor 70, 80, 81 have completed their task (of effecting angular movement of the article 15 in the socket 14 to the first angular position) and, therefore, the prime mover M1 is then caused to retract the slide 64 so that its slot 63 reassumes the position of FIGS. 2 and 3 in which it is free to receive the shank 59 of the foremost article 15 on the rail 62. This is shown in FIG. 8 wherein the slide 64 has completed its return movement (arrow 84') to the position corresponding to that of FIGS. 2 and 3. The article 15 in the socket 14 continues to dwell in the first angular position corresponding to that in which the follower 70 has actually located and has penetrated into the respective marker 29. The lever 72 is automatically pivoted in a counterclockwise direction in response to movement of the slide 64 in the direction of arrow 84' because the lobe 76 then reengages the cam face 77 of the guide 66 and the spring 75 is caused to store energy while the shutter 79 reassumes the operative position in which it blocks the propagation of radiation from the radiation source 80 to the transducer 81.

The controls of the improved apparatus further comprise a selector switch S1 which is provided with a manually operable portion 90 (e.g., a pointer or hand) movable with reference to a scale 91 on the selector switch S1 to thereby select the extent of angular movement of the article 15 in the socket 14 from the first angular position (as determined by the signal via conductor means 87) to the selected second angular position in which the article 15 is ready to be applied or affixed to a garment or to another commodity on the platform 26.

The control unit C1 further determines the direction of rotation of the ram 11 and holding device 12 in response to a signal via conductor means 85. The arrangement is such that the motor 40 invariably causes the holding device 12 to turn in a direction which is necessary to move the article 15 in the socket 14 through the shorter of two distances on its way from the first angular position of FIG. 7a to the second angular movement through an angle (arc 100') of approximately 90° instead of a clockwise movement through an angle of approximately 270° (in order to move the marker 29 of the respective article from the position 29' to the position 29"). The motor 40 can be restarted with a predetermined delay following stoppage in response to a signal from the transducer 81, or such restarting can be initiated by the operator who is in charge of the improved apparatus. The direction of rotation of the ram 11 and holding device 12 in order to move the article 15 from the first angular position of FIG. 7a to the second angular position of FIG. 8a is indicated by the arrow 89 (FIG. 8). The motor 40 is arrested by the control unit C1 as soon as the marker 29 of the article 15 in the socket 14 reaches the second angular position 29".

It is presently preferred to select a cycle in such a way that the cycle starts with the affixing of a properly oriented article 15 to a garment or to another commodity on the platform 26 and ends with completion of orientation of a fresh article 15 in the apparatus so that such article is ready to be affixed when the next cycle begins. This enables the operator to properly position a garment on the platform 26 before the aforementioned pedal (switch S5) is depressed in order to start the next cycle.

Actuation of the switch S5 entails a downward movement of the holding device 12 and of its engaging means 13 (with the properly oriented article 15 in the socket 14) so that the article is moved close to the garment on the platform 26. Such movement is imparted to the holding device 12 by the motor M1 by way of the operative connection 92 and a linkage H or the like. It will be noted that the motor M1 serves to reciprocate the holding device 12 (via connection 92) as well as the ram 11 (via connection 55).

Figures 9, 9A:
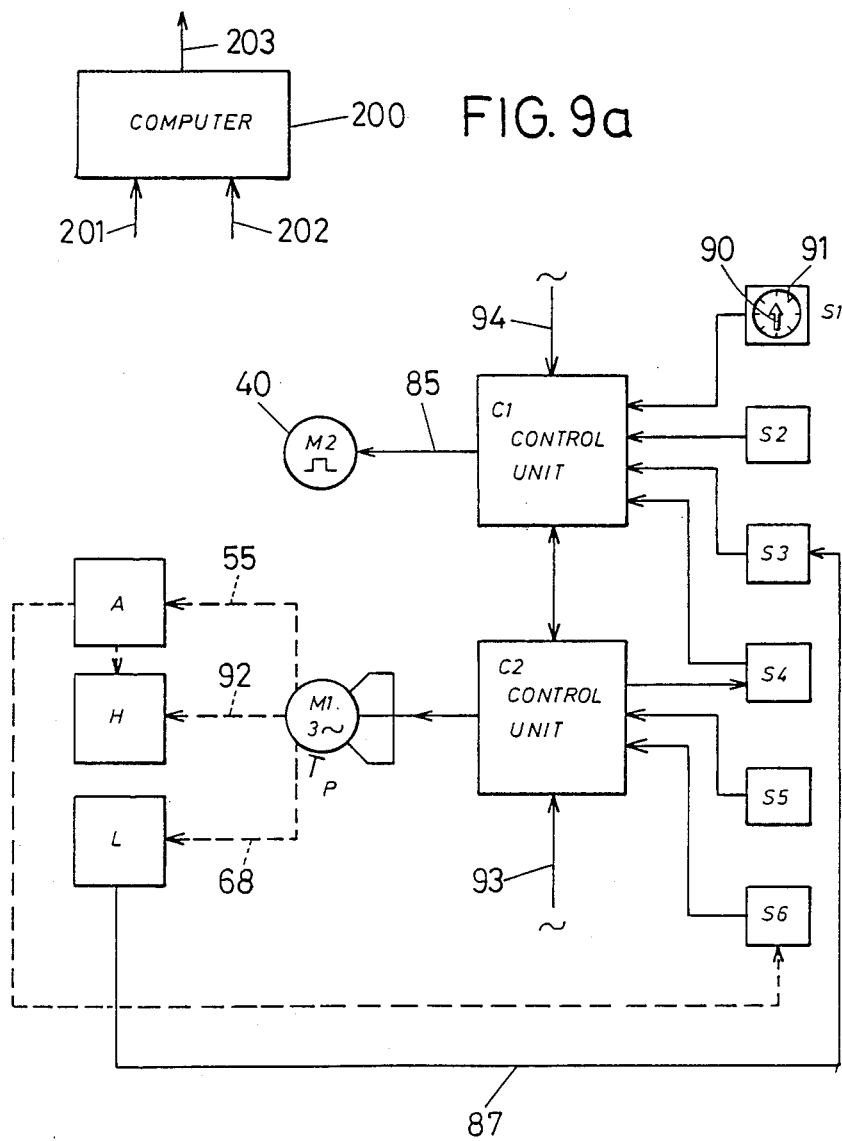
FIG. 9 is a diagram of the electrical electronic and certain mechanical components of the apparatus.
FIG. 9a is a schematic view of a computer which can be used in the improved apparatus in lieu of or in addition to one of the switches which are shown in FIG. 9.

While it moves downwardly toward the platform 26, the holding device 12 can perform the function of a sensor which protects a careless operator from injuring her or his hand. Thus, if the descending holding device 12 encounters a certain maximum permissible resistance to further movement toward the platform 26, it actuates a safety switch (not shown) which disconnects the control unit C2 from the energy source (indicated by arrow 93 which is shown in FIG. 9) so that the prime mover M1 is arrested and prevents the ram 11 from performing a downward stroke which would result in expulsion of a properly oriented article 15 from the socket 14 of the holding device 12. The holding device 12 can further serve to disconnect the control unit C1 for the stepping motor 4 from the respective energy source (denoted by the arrow 94).

If the descending holding device 12 fails to arrest the prime mover M1, the latter causes the operative connection 55 to initiate a downward movement of the ram 11 and the attachment of a properly oriented article 15 to the garment on the platform 26. The shank 59 penetrates through the garment and is caused to be affixed to the complementary detent member of the article on the anvil 21 of the lower tool 20.

FIG. 7a shows by solid lines the first predetermined angular position 29' of the marker 29 on the respective article 15. The article 15 is shown from below (as seen in FIG. 7) and is in that angular position in which the motor 40 has been brought to a standstill in response to penetration or partial penetration of the follower 70 into the marker 29 (in the position 29' of this marker). Two initial or starting positions of the marker 29 are shown by broken lines at different distances (note the arcs 100 and 100') from the first predetermined position (29'). The arc 100' extends between the radial lines 99 and 99', and the longer arc 100 extends between the radial lines 99' and 199. The extent of first angular movement of the holding device 12 with an article 15 in its socket 14 (to the first angular position 29' of the respective marker 29) depends upon the initial angular position of the marker (i.e., whether in register with the radial line 99 or 199). The holding device 12 is assumed to be rotated in the direction of arrow 86 which is shown in FIG. 6, i.e., in one and the same direction irrespective of the angular distance between the initial position and the position 29' of the marker 29 on the article 15 in the socket 14.

FIG. 8a shows the first predetermined angular position (29') of the marker 29 by broken lines, and the second or final angular position 29" by solid lines. The extent of angular movement which is necessary to turn the marker 29 from the position 29' to the position 29" is indicated by the arc 100' between the radial lines 99' and 99". Such angular movement (arc 100') is selected by the switch S1 or by a computer. The motor 40 turns the article 15 in the socket 14 in the direction of arrow 89 (FIG. 8). The control unit S1 can select the direction of rotation of the holding device 12 in order to move the marker 29 from the position 29' to the position 29". The counterclockwise direction (arrow 89) is selected because the extent of angular movement is less than if the marker 29 were to move from the position 29' to the position 29" by turning the holding device 12 in a clockwise direction (as seen in FIG. 8a).

If the article 15 of FIG. 8a is to be rotated with the holding device 12 to move the marker 29 from the first predetermined angular position 29' to a second angular position 103 (indicated by broken lines), the control unit C1 causes the motor 40 to turn the article in a clockwise direction along the arc 102 between the radial lines 99' and 101. The utilization of a reversible stepping motor contributes to the output of the apparatus because the angular movement of the holding device 12 in order to move the marker 29 from the position 29' to the position 103 takes less time than if the holding device 12 were to rotate in a counterclockwise direction, i.e., along an arc of approximately 270° from the line 99' to the line 101.

FIGS. 10, 11 and 12 show three different garments which are provided with articles 15 and complementary articles (not shown). The illustrated articles 15 are parts of buttons which can serve a decorative and/or a utilitarian purpose. The right-hand half of FIG. 10 shows a portion of a jacket to be worn by a woman with a row 95 of articles 15 applied in proper orientation, and an additional article in position 98 on the flap of a pocket. The left-hand half of FIG. 10 shows a portion of a jacket to be worn by a man or a boy with a row 96 of articles and an additional article on the flap of a pocket.

FIG. 11 shows a pair of trousers with a single article 15 on the pocket.

FIG. 12 shows a pair of trousers with a single article 15 at the waist (position 97) and two articles on the flaps of the pockets (positions 98).

In order to apply the articles of the row 96, it is necessary to change the orientation of such articles through 180° with reference to the orientation of the articles which form the row 95 because the position of a jacket for men (on the platform 26) is different from the position of a jacket for women. This can be readily accomplished by the simple expedient of adjusting the position of the manually operable part 90 of the switch S1 so that the part 90 is brought into register with the corresponding graduation of the scale 91. The holding device 12 assumes a starting angular position which is shown in FIG. 6 irrespective of the initial orientation of successive articles 15 which are supplied by the rail 62. In order to turn the articles 15 which form the row 95 from their first angular positions to the second angular positions (as determined by the selected position of the part 90 relative to the scale 91 of the switch S1), the holding device 12 must be rotated in the direction of arrow 89 which is shown in FIG. 16. On the other hand, the articles 15 which form the row 96 must be moved from first to second angular positions by turning them in the direction of arrow 89' which is shown in FIG. 14. In other words, the final angular position of the marker 29 on the article 15 of FIG. 16 (row 95) is a mirror image of the final angular position of the article 15 of FIG. 14 (row 96).

The most convenient final angular position of an article 15 which is to be applied to the waist of a garment (at 97 in FIG. 12) is obtained by turning the article in a manner as shown in FIG. 13 (arrow 89) so that the final position of the marker 29 is midway between the final positions of the markers shown in FIGS. 14 and 16. The same applies for the final orientation of the article 15 which is shown in FIG. 11 and is intended to serve a purely decorative purpose.

The articles 15 which are to be affixed to garments to assume the positions 98 are turned to final angular positions in a manner as shown in FIG. 15 (rotation of the holding device 12 in the direction of arrow 89 through an angle other than those shown in FIGS. 13, 14 and 16). Thus, the application of articles 15 to pivotable flaps for pockets necessitates or can necessitate a different final orientation of articles than for the application in the form of rows 95, 96 and at the waist (locus 97). The angular position of the part 90 of the selector switch S1 can be changed upon completion of a cycle or even while the holding device 12 turns with an article 15 in its socket 14 in order to assume the first angular position (in which the follower 70 enters or engages the respective marker 29).

FIG. 9 further shows an on-off switch S2 for the motor 40. This switch can be actuated when the apparatus is used to apply articles which need not be moved to predetermined angular positions prior to being affixed to garments or the like. For example, the switch S2 can be actuated to turn the motor 40 off if the articles 15 are devoid of designs 28 so that an article in the socket 14 is invariably ready for attachment to a garment irrespective of its angular position.

FIG. 9a shows schematically a computer 200 having a first input 201 and a second input 202. The output 203 of the computer 200 can be connected to the control unit C1 for the stepping motor 40 in addition to or in lieu of the selector switch S1. The computer 200 will be put to use if it is desired or necessary to further automate the operation of the improved apparatus. The input 201 serves for reception of data (e.g., from a keyboard) which denote the numbers of articles 15 which are to be affixed to a garment or to a series of garments in a number of different final angular positions. The input 202 serves to receive data denoting the different final angular positions of successive selected numbers of articles. For example, if the apparatus is to be used to apply five articles 15 each to a series of similar or identical jackets of the type shown in the right-hand portion of FIG. 10, the input 201 will receive information denoting that the apparatus should apply four articles 15 (row 95) in a first final orientation (FIG. 16) and that one article should be applied in a final orientation as shown in FIG. 13. The input 202 will receive information to select the first final orientation for four successive cycles and to select the second final orientation for the next-following cycle. The program of the computer 200 can be varied practically at will, depending upon the nature of garments which are to be provided with articles and on the sizes of garments. The provision of a computer is particularly desirable and advantageous if the apparatus is to be used to apply articles 15 to a large number of identical garments in identical distribution and orientation. All the operator must memorize is the sequence in which the articles are to be applied to each garment, e.g., starting with the lowermost article of the row 95, proceeding toward the uppermost article of the row 95, and thereupon to the article at the locus 98 to the right of the topmost article of the row 95.

The provision of a computer in lieu of the switch S1 contributes significantly to higher output of the apparatus and enables the attendant to devote more time to proper positioning of a garment on the platform 26.

A computer can also be used with great advantage if the apparatus is to be set up to apply different types of articles to different types of garments or the like. For example, the magazine which supplies articles to the rail 62 of the source 61 of FIG. 2 can be designed to deliver a first predetermined number of articles of a first type, followed by a second predetermined number of articles of a second type, and so forth The computer is then programmed to ensure proper orientation of articles of the first type, articles of the second type, and so on. In fact, a computer can also be used to ensure that a single magazine or a set of two or more discrete magazines will deliver predetermined numbers of different types of articles to the rail 62 in a predetermined sequence. If one and the same transferring device 60 is incapable of transferring different types of articles (or is capable of transferring a limited number of different (e.g., differently dimensioned) articles), the apparatus can be furnished with two or more discrete transferring devices 60 each of which can handle articles of a particular type or articles of a limited number of different types. Such apparatus then preferably further comprises means for automatically moving selected transferring devices 60 to and from operative positions (with reference to the holding device 12) in accordance with a preselected program. In other words, the apparatus can employ a number of discrete computers (e.g., one in addition to or in lieu of the switch S1, one in conjunction with the magazine or magazines which supply articles to the source 61, and one in conjunction with two or more discrete transferring devices 60) or a single computer which can perform all of the operations that are necessary to automate the operation of the improved apparatus to any desired extent.

The improved apparatus can be modified in a number of additional ways. For example, it is not necessary that the transferring device 60 assume the position of FIGS. 1 and 3 upon completion of a working cycle. Such position of the transferring device 60 is often preferred because the ram 11 and the holding device 12 are then maintained in their uppermost or fully retracted positions. The following sequence of stages in a complete working cycle has been found to be particularly satisfactory:

When a cycle is completed, a properly oriented article 15 is held in the socket 14 of the engaging means 13 (i.e., the angular position of the marker 29 on such article then corresponds to the position 29″ or 103 of FIG. 8a). The slide 64 of the transferring device 60 is still held in the extended position of FIG. 7 (rather than in the retracted position of FIG. 8). In such position of the slide 64, the lobe 76 is disengaged from the cam face 77 and the spring 75 is free to maintain the lever 72 in an angular position in which the shutter 79 cannot block the propagation of radiation from the radiation source 80 to the transducer 81. Thus, the motor 40 is idle and the extent of second angular movement of the holding device 12 (to move the marker 29 of an article 15 from the first angular position 29′ to the second angular position 29″ or 103) can be selected at will, i.e., within the limits imposed by the switch S1 or the computer 200. This exhibits the advantage that the second angular movement of the holding device 12 can be selected while the motor 40 is idle and the ram 11 and holding device 12 are retracted.

For example, if the previous setting of the switch S1 was unsatisfactory and the article 15 in the engaging means 13 of the holding device 12 has assumed an improper final angular position, the operator has ample time to change the position of the part 90 with reference to the scale 91 so that the motor 40 is started again and moves the article 15 to the proper final angular position before the downward stroke of the ram 11 begins. In other words, the final angular position of the article in the holding device 12 can be altered during the interval between two successive cycles. This exhibits the advantage that a final check is possible before the article is actually applied to a commodity on the platform 26.

The slide 64 of the transferring device 60 is retracted to the position of FIG. 8 not later than when a fresh cycle begins, i.e., before the ram 11 begins to move from the retracted position of FIG. 1 to the extended position in which the article 15 is expelled from the socket 14 and is affixed to the complementary article on the anvil 21 of the lower tool 20. The slide 64 then receives a fresh (randomly oriented) article 15 from the source 61 while the finally oriented article 15 is in the process of being expelled from the socket 14 and of being affixed to the garment on the platform 26.

An important advantage of the improved apparatus is that the device (60) which is used to transfer randomly oriented articles 15 from the source 61 to the orienting station (socket 14) can serve as a carrier of sensor means 70, 79, 80, 81 which controls the operation of the stepping motor 40 up to and including the instant when the article in the socket 14 assumes a first predetermined angular position. This renders it possible to select the second or final angular position of each article 15 practically at will and during any desired stage of a machine cycle by the simple expedient of providing the selector switch S1 and/or computer 200 which ensures that the final angular position of each article can be any one of two or more different final positions, depending on the setting of the mobile part 90 of the switch S1 or on the programming of the computer 200.

Another important advantage of the improved apparatus is that the transferring device 60 can perform the additional function of assisting the engaging means 13 in properly holding an article 15 which is in the process of rotating, either to its first angular position (corresponding to the position 29′ of the marker 29 shown in FIG. 7a) or to the second or final angular position (corresponding to the position 29″ or 103 of the marker 29 in FIG. 8a). Alternatively, the second angular movement of each article 15 can take place in retracted position of the transferring device 60 so that the latter can receive a fresh randomly oriented article 15 from the rail 62 while the article 15 in the socket 14 is in the process of being turned to its final angular position.

Since each of a short or long series of successively manipulated articles 15 is moved to an accurately determined final angular position, the task of the operator in charge of positioning garments on the platform 26 is simplified because the operator knows that the garment must always be located on the platform in a single predetermined position if an article is to be applied to form part of the row 95, 96 or to be applied at the locus 97 or 98. In fact, the operator can place the garment on the platform 26 in one and the same position irrespective of the locus of application of any one of several successive articles 15 because the switch S1 can be adjusted after each cycle or prior to each cycle, or the computer 200 can be programmed accordingly, i.e., the final orientation of successively applied articles need not be the same if it is more convenient and less time-consuming to change the orientation of successively applied discrete articles or successively applied sets of articles rather than to repeatedly change the orientation of the garment with reference to the platform 26.

A further important advantage of the improved apparatus is that the wear on many of its parts is minimal or negligible because the holding device 12 is designed to lift the articles 15 off the upper side 65 of the slide 64 before the motor 40 is set in operation to change the angular position of the article in the socket 14. This reduces or eliminates wear upon the engaging means 13 and upon the slide 64 and ensures more reliable and more rapid turning of the articles to positions in which their markers 29 are detected by the follower 70 on the lever 72 of the transferring device 60. Furthermore, this reduces the likelihood of damage to the articles in the course of the orientation changing operation because the articles are less likely to slide relative to the prongs of the engaging means 13 and/or vice versa.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for orienting discrete articles of the type including buttons, portions of rivets and other notions wherein the articles are provided with orientation indicating markers, comprising a rotary article holding device having means for non-rotatably engaging one article at a time; stepping motor means operative to rotate said holding device; a source of randomly oriented articles; a device for transferring discrete articles from said source to said holding device; sensor means provided on at least one of said devices to monitor the position of an article by scanning the article for the respective marker and including means for transmitting first signals enabling said motor means to rotate said holding device, while the article having the scanned marker is held by said engaging means, until the holding device and such article assume a first predetermined angular position; and selector means including means for transmitting to said motor means second signals to rotate said holding device and the article held by said engaging means from said first angular position to a predetermined second angular position.

2. The apparatus of claim 1 for orienting discrete articles and for attaching oriented articles to commodities, such as garments, further comprising a support for commodities adjacent said holding device, and means for affixing oriented articles which are held by said engaging means in second angular positions to commodities on said support, including a ram and means for reciprocating said ram relative to and substantially axially of said holding device between a retracted and an extended position whereby the ram expels an oriented article from said engaging means and affixes such article to the commodity on said support during movement to said extended position.

3. The apparatus of claim 2, wherein said motor means includes means for rotating said ram and said ram includes means for rotating said holding device.

4. The apparatus of claim 1, wherein said sensor means is provided on said transferring device.

5. The apparatus of claim 1, wherein at least one of said devices is movable relative to the other of said devices to transfer an article from said transferring device to said engaging means and the thus transferred article is temporarily held by said engaging means and said transferring device, said sensor means being operative to detect the markers of articles which are temporarily held by said engaging means and said transferring device.

6. The apparatus of claim 1, further comprising means for moving said holding device substantially axially relative to said transferring device to and from a predetermined axial position in which said engaging means non-rotatably engages a randomly oriented article in said transferring device.

7. The apparatus of claim 6, wherein said transferring device includes means for maintaining a randomly oriented article therein in a predetermined position relative to said holding device.

8. The apparatus of claim 6 for orienting discrete articles and for attaching oriented articles to commodities, such as garments, further comprising a support for commodities adjacent said holding device, means for moving said holding device with an oriented article held by said engaging means to a position adjacent the commodity on said support subsequent to movement of said holding device relative to said transferring device to said predetermined axial position, and means for affixing oriented articles which are held by said engaging means to commodities on said support while the holding device is adjacent the commodity on said support, said affixing means including a ram and means for reciprocating said ram relative to and substantially axially of said holding device between a retracted and an extended position whereby the ram expels an oriented article from said engaging means and affixes such article to the commodity on said support during movement to said extended position.

9. The apparatus of claim 6, wherein said engaging means includes a socket which receives the article from said transferring device in response to movement of said holding device to said predetermined axial position, said sensor means being provided on said transferring device and said moving means including means for moving said holding device from said predetermined axial position through a short distance to a second axial position in which the marker of the article is adjacent and can be monitored by said sensor means while the holding device and the article in said engaging means are free to rotate relative to said transferring device.

10. The apparatus of claim 9, wherein said transferring device includes a bearing for a portion of the article in said engaging means in said second axial position of said holding device.

11. The apparatus of claim 10 for orienting substantially round articles having coaxial shanks, wherein said bearing includes a slot for the shank of the article in said engaging means.

12. The apparatus of claim 1, wherein said sensor means includes a spring-biased follower which is movably mounted in said at least one device.

13. The apparatus of claim 12 for orienting articles having markers including unevennesses, wherein said follower is operative to track the article which is rotated by said engaging means to effect the generation of a signal in response to detection of the unevenness on the tracked article.

14. The apparatus of claim 13, wherein said sensor means further comprises an optoelectronic detector operative to generate a signal to arrest said motor means in response to detection of an unevenness by said follower.

15. The apparatus of claim 14, wherein said transferring device comprises a lever having a first arm supporting said follower and a second arm, and means for biasing said lever to a position in which said follower tracks the article rotating with said engaging means, said detector including a radiation source and a signal-generating transducer operatively connected to said motor means, said second arm being disposed between said radiation source and said transducer and being movable between first and second positions, in one of which radiation from said radiation source impinges upon and in the other of which such radiation cannot reach said transducer, in response to detection of an unevenness by said follower.

16. The apparatus of claim 14 for orienting articles of the type having an annular rim and a marker in the form of a recess in the rim, wherein said follower includes a substantially pin-shaped portion which is biased to enter the recess of the rim on an article which is rotated by said engaging means.

17. The apparatus of claim 1 for orienting discrete articles and for attaching oriented articles to commodities, such as garments, further comprising a support for commodities adjacent said holding device, means for affixing oriented articles which are held by said engaging means in second angular positions to commodities on said support including a ram and means for reciprocating said ram relative to and substantially axially of said holding device between a retracted and an extended position whereby the ram expels an oriented article from said engaging means and affixes such article to the commodity on said support during movement to said extended position, means for transmitting torque from said motor means to said ram, and means for rotating said holding device in response to rotation of said ram.

18. The apparatus of claim 17, wherein said ram includes an extension extending in a direction away from said holding device and said torque transmitting means is interposed between said motor means and said extension.

19. The apparatus of claim 17, further comprising means for rotatably coupling said ram to said reciprocating means.

20. The apparatus of claim 17, wherein said rotating means includes means for axially movably connecting said ram and said holding device to each other.

21. The apparatus of claim 1, wherein said engaging means comprises a plurality of resilient sections defining a socket for discrete articles.

22. The apparatus of claim 1, wherein said selector means includes means for selecting the extent and the direction of rotation of said holding device with an article in said engaging means as a function of the difference between said first and second angular positions.

23. The apparatus of claim 1, wherein said selector means comprises a switch including a portion movable by hand between a plurality of different positions each corresponding to a different second angular position of an article which is held by said engaging means.

24. The apparatus of claim 1, wherein said selector means includes a computer having a first input for data denoting the second angular positions of articles which are held by said engaging means, and a second input for data denoting the number of successive articles which are to assume identical second angular positions.

25. The apparatus of claim 1, further comprising means for affixing articles to commodities, such as garments, upon completion of rotation of articles and said engaging means to said second angular positions.

26. The apparatus of claim 1, wherein said selector means includes means for selecting for the articles in said engaging means any one of a plurality of different second angular positions and means for operating said motor means to rotate said engaging means to a different second angular position in response to selection of such different angular position by said selecting means.

27. The apparatus of claim 1, further comprising means for moving said transferring device between said source of randomly oriented articles and said holding device.

28. The apparatus of claim 27, further comprising means for attaching oriented articles to commodities, such as garments, during a series of successive cycles, said transferring device being adjacent said holding device between said successive cycles.

* * * * *